Patented Sept. 24, 1935

2,015,254

UNITED STATES PATENT OFFICE 2,015,254

PROCESS OF PURIFYING HIGH-BOILING MINERAL ACIDS

Johan Ferdinand Maurits Caudri, Amsterdam, Netherlands, assignor to Shell Development Company, San Francisco, Calif.

No Drawing. Application October 10, 1932, Serial No. 637,207. In the Netherlands June 14, 1932

7 Claims. (Cl. 23—172)

The invention relates to a process of destroying organic substances in high-boiling mineral acids and more particularly is concerned with the oxidation of organic matter and carbon in high-boiling mineral acids, such as $H_2SO_4$, $H_3PO_4$ and the like, by means of heat and air or other oxygen-containing fluid (which may be the high-boiling mineral acid itself) in the presence of a suitable catalyst.

Waste acid containing carbonaceous materials, as for example obtained in the preparation of alcohols from olefines via alkyl sulphuric acid or resulting from sulphuric acid treatment of petroleum distillates, etc., can be regenerated in a relatively short period of treatment when resort is had to my particular catalyst, although my invention is not restricted to any one source of the waste acid.

In order to destroy contained carbonaceous materials and to regenerate the waste acid, prior investigators have heated waste acid with or without simultaneous agitation with air. Frequently the chemical nature of the organic matter present in recovered acid, such as sulphuric acid, is such that it is more readily oxidized by the hot acid than by air. As a result, part of the sulphuric acid is decomposed with formation of $SO_2$ and lost.

Another drawback of the known processes lies in the considerable amount of time required for the total destruction of the organic substances, which is accompanied by great heat consumption.

Instead of depending solely upon the agency of heat and air or other oxygen-containing fluid for the oxidizing action I employ an element of the sixth group of the periodic table such as sulphur, selenium or tellurium or compounds thereof such as selenic dioxide or telluric acid as catalysts although sulphur is not as efficient as the metalloids or their compounds. In this way I provide a means of effecting a destruction of the organic substances in an appreciably shorter time and with less reduction of the waste acid.

The following is an example cited for illustrative purposes only:

75 cc. waste sulphuric acid, originating from the preparation of isopropyl alcohol from isopropylene via isopropyl sulphuric acid, which requires 1.60 gms. of oxygen for the complete oxidation of the organic substance (e. g. with chromic acid), was heated for half an hour in the presence of 0.25 gm. of selenium. The amount of oxygen consumed by the organic substance in the residues now still amounts to 0.44 gm. In the parallel experiments, in the absence of selenium, the oxygen consumption of the organic substance in the residue appeared to be 0.88 gm. when heating for half an hour, and 0.45 gm. after heating for two hours. Thus the decomposition of the organic substance was accelerated fourfold by the use of selenium. The same experiment carried out in the presence of 0.24 gm. tellurium, when heating for half an hour, showed an oxygen consumption of 0.52 gm. in the residue.

The experiments were carried out under agitation with air. The temperature of heating was about 300° C.

It has already been proposed in the regeneration of sulphuric acid under heating and agitation with air to apply antimony sulphate as a catalyst (U. S. 1,805,247). It has been found, however, that this and other substances, such as copper, mercury, cobalt, chromium, iron, manganese, vanadium and molybdenum compounds do not, or only slightly tend to, shorten the regeneration period.

It may be found suitable to employ mixtures of my specific catalysts with known ones, such as those described above.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent in the invention as broadly as is possible in view of the prior art.

What I claim is:

1. The process of oxidizing organic matter and carbon present in a high-boiling mineral acid, comprising: subjecting the high boiling mineral acid to the oxidizing action of an oxygen-containing fluid at an elevated temperature in the deliberate presence of an oxidation catalyst containing a member of the group consisting of selenium and tellurium present in a quantity in excess of that which may have been present in the acid when prepared.

2. The process of oxidizing organic matter and carbon present in a high-boiling mineral acid, comprising: subjecting the high boiling mineral acid to the oxidizing action of an oxygen-containing gas at an elevated temperature in the presence of a member of the group consisting of selenium and tellurium present in a quantity in excess of that which may have been present in the acid when prepared.

3. The process of oxidizing organic matter and carbon present in a high-boiling mineral acid, comprising: subjecting the high boiling mineral acid to the oxidizing action of an oxygen-containing gas at an elevated temperature, in the deliberate presence of a compound of a member of the group consisting of selenium and tellurium present in a quantity in excess of that which may have been present in the acid when prepared.

4. The process of oxidizing organic matter and carbon present in sulphuric acid, comprising: subjecting the acid to the oxidizing action of an oxygen-containing fluid, at an elevated temperature in the presence of an oxidation catalyst containing a member of the group consisting of selenium and tellurium present in a quantity in excess of that which may have been present in the acid when prepared.

5. The process of oxidizing organic matter and carbon present in sulphuric acid, comprising: subjecting the acid to the oxidizing action of air at an elevated temperature in the presence of a member of the group consisting of selenium and tellurium present in a quantity in excess of that which may have been present in the acid when prepared.

6. The process of oxidizing organic matter and carbon present in sulphuric acid, comprising: subjecting the acid to the oxidizing action of air at an elevated temperature in the deliberate presence of a compound of a member of the group consisting of selenium and tellurium present in a quantity in excess of that which may have been present in the acid when prepared.

7. The process of oxidizing organic matter and carbon present in a high-boiling mineral acid, comprising: subjecting the high-boiling mineral acid to the oxidizing action of air at an elevated temperature in the presence of an oxidation catalyst containing a member of the group consisting of selenium and tellurium present in a quantity in excess of that which may have been present in the acid when prepared.

JOHAN FERDINAND MAURITS CAUDRI.